Jan. 6, 1970  
L. J. MEYER  
3,487,924  
PROCESS AND APPARATUS FOR SEPARATING CASEBEARER LARVAE FROM NUTMEATS  
Filed April 12, 1968  
2 Sheets-Sheet 1

LEO J. MEYER  
INVENTOR  
BY: *[signature]*  
ATTORNEY

Jan. 6, 1970  L J MEYER  3,487,924
PROCESS AND APPARATUS FOR SEPARATING
CASEBEARER LARVAE FROM NUTMEATS
Filed April 12, 1968  2 Sheets-Sheet 2
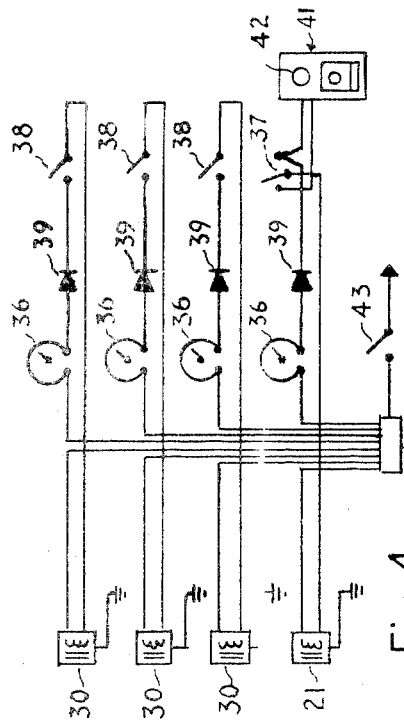
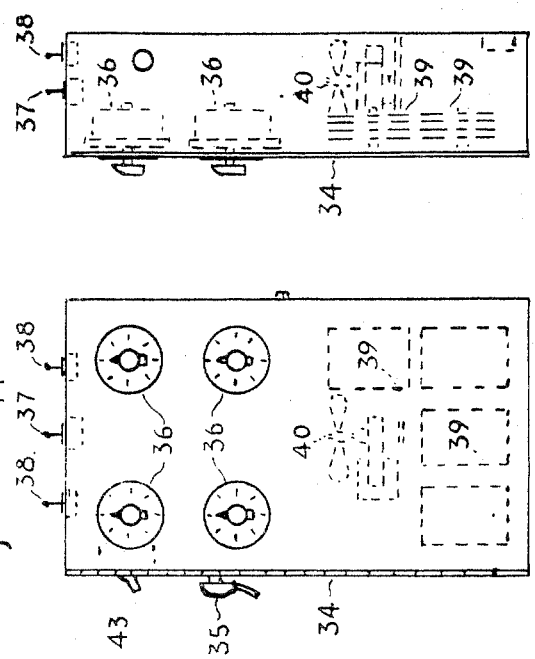
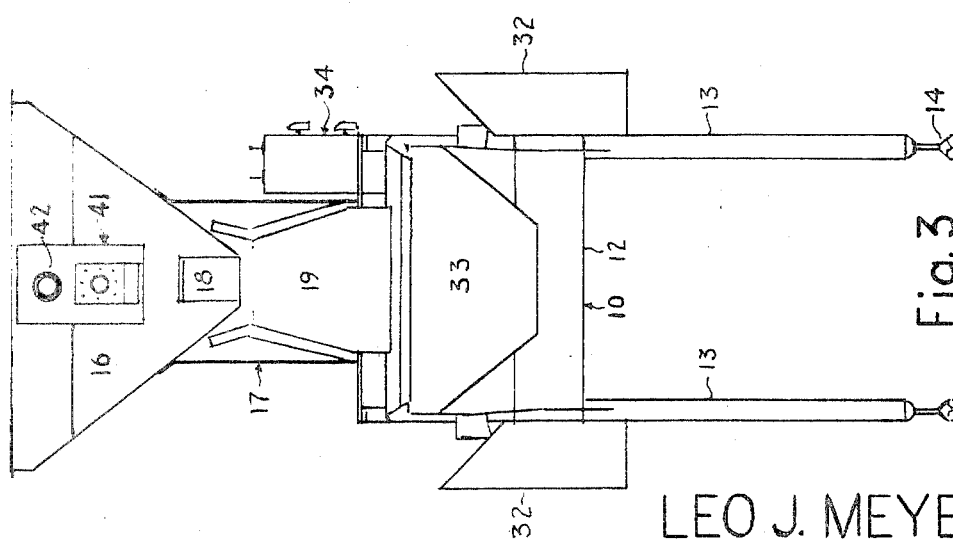
LEO J. MEYER
INVENTOR

United States Patent Office 3,487,924
Patented Jan. 6, 1970

3,487,924
PROCESS AND APPARATUS FOR SEPARATING CASEBEARER LARVAE FROM NUTMEATS

Leo J. Meyer, San Antonio, Tex., assignor to Meyer Machine Company, a division of Ramo, Inc., San Antonio, Tex.
Filed Apr. 12, 1968, Ser. No. 720,847
Int. Cl. B07b 13/10
U.S. Cl. 209—75         8 Claims

ABSTRACT OF THE DISCLOSURE

A machine for separating casebearer larvae from pecan meats comprising a feed hopper with vibrating feed chute, a series of inclined vibrating tables including worm grooves, receptacles adjacent to discharge end of the worm grooves, a pecan meat discharge chute adjacent the last table in the series, a supporting frame including cushioned counter balanced vibrating bases for spring mounting the tables, electromagnetic vibrator secured to each table and feed chute, and a power panel including a rheostat and selenium rectifiers adapted to adjustably power each vibrator with half wave pulses, and a timer associated with power supply to the feed chute vibrator.

---

This invention pertains generally to food processing and is designed to effectively accomplish the task of removing casebearer larvae or pecan worms from pecan meats. Heretofore the prevailing custom in the industry was to remove the worms on a picking table under ultraviolet light which caused the larvae to glow. This hand picking process is slow and expensive. Numerous vibrating sorting machines are quite old and well known in the art. Some of the early efforts were devoted to separating wild peas from wheat and peas and peanuts from the shells.

Devices heretofore known in the art were not satisfactory for the exacting task of separating the casebearer larvae or pecan worms from the small pieces of pecans. Very exacting improvements in the vibrating table were arrived at after extensive research.

The final embodiment utilizes vibrating tables inclined at approximately eight degrees (8°). These tables are mounted on springs which in turn are mounted on rubber cushioned vibrating bases, including a counter balance arm. The tables are vibrated by an electromagnet having a loaded armature. The vibrators are powered through rheostats which permit adjustment of the amplitude of the vibration. In operation the vibration is adjusted to an amplitude which will move the angular meats up the inclined table while permitting the relatively round inactivated casebearer larvae to roll to the bottom edge of the vibrating tables where they are discharged through the larvae groove. The magnets are driven by the half wave of an alternating current power supply passing through selenium rectifiers. An advance design feed hopper was developed evenly distributing material to the processing tables, the pecan meat meal will cling to the surface of the table and disrupt the separating process, accordingly, a pecan meal trap is provided on the first vibrating table. Despite this step in the process, the tables may become eventually clogged with meal and permit the larvae to move up the table. A timer is designed in the circuit to the feed hopper to cut off the feed and activate the warning light.

The principal object of this invention was to develop an effective process and machine for removing the casebearer larvae or pecan worm from small broken pecan meats.

Other objects accomplished and advantages achieved will become apparent from the study of the following views and description wherein like referenced characters refer to like or equivalent components throughout the several views.

FIG. 3 is a front planed view or elevation taken substantially on line 3—3 of FIG. 1 looking in the direction of the arrows.

FIG. 4 is a schematic wiring diagram of the power supply of the machine and the timing circuit to the vibrator of the feed chute.

FIG. 5 is a front elevation of the power supply control plant panel.

FIG. 6 is a side elevation of the power supply control panel.

Figure 1:
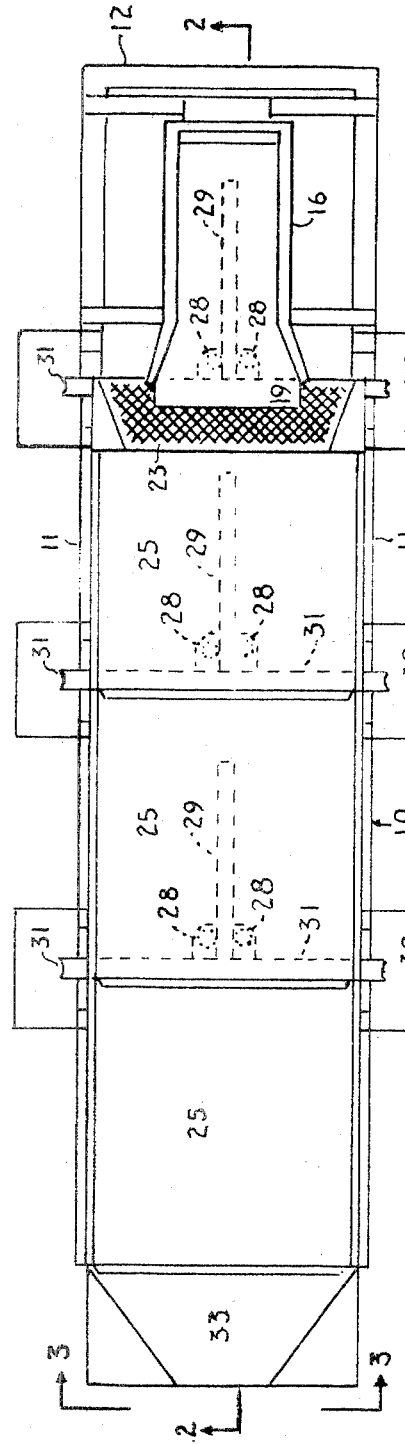
FIG. 1 is a top planed view disclosing the machine as viewed from above with the feed hopper and feed hopper mounting base removed.
Figure 2:
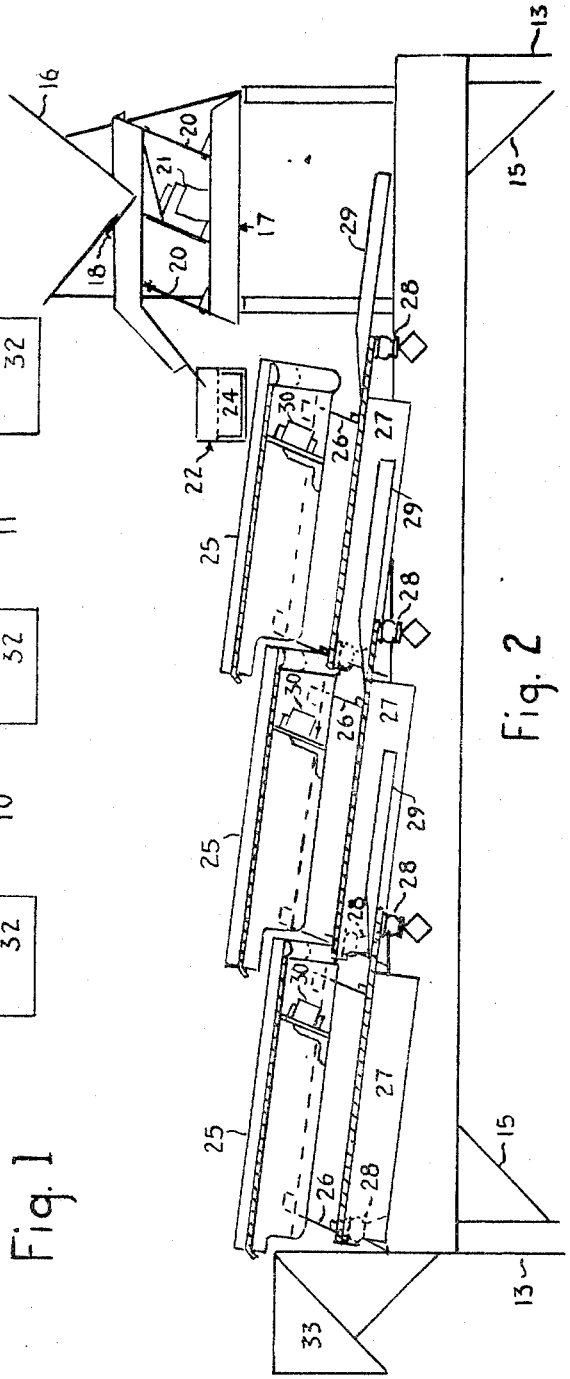
FIG. 2 is a sectional view taken on line 2—2 of FIG. 1 looking in the direction of the arrows.

The outward appearance of the device resembles the vibrating pecan inspection tables which have been used for many years. The difference in construction is not apparent from a casual observation. Referring to FIG. 2 and 3, the frame 10 of the device is constructed with longitudinal stringers 11 and diagonal beams 12. The legs 13 are welded to the frame 10 and stabilized by gussets 15. The leveling or desired slope of the device can be varied by the adjustable feet 14 which are screw mounted in the legs 13. The materials to be processed are fed to the machine by means of a feed hopper 16 which is secured to the frame by means of a feed hopper mounting base 17. An adjustable feed gate 18 varies the opening from the hopper 16 to the feed chute 19 which is mounted for vibration on the feed chute mounts 20. The feed chute 19 is preferably vibrated by means of an electromagnetic feed chute vibrator 21. This vibrator is conventional in construction and readily available from commercial sources and is not illustrated in detail. This device is constructed with an outer coil and internal armature, attached to the armature is a weight or vibrator load which is retained by flexible mounts ordinarily rubber or plastic. A pulsed charge to the coil causes an instantaneous pull against the weight by the armature. A periodic pulse will cause the vibrator and the object upon which it is mounted to vibrate at the frequency of the power cycle.

The feed chute empties into a meal trap 22 which comprises a perforated screen 23 and a sliding drawer referred to as a meal receptacle 24. This component is positioned intermediate the feed chute 19 and the first of a series of inclined vibrating tables 25. These vibrating tables 25 are flexibly mounted on the vibrating table spring mounts 26. Development work and research reveal that a direct mounting of the springs on the frame 10 would not accomplish the desired results. The vibrating tables for optimum results must be mounted on a vibrating table base 27 which is secured at the two forward corners and at the rear center by rubber mounting cushions 28. A further refinement was discovered in counterbalanced arm 29 which should project to the rear from the center of the rear edge of the vibrating base 27. This counterbalance arm 29 dampens and smoothes the vibration of the table 25 imparting a characteristic vibration to the tables 25 required for optimum separation of casebearer larvae or pecan worms from the pecan meats. The characteristics of this arm 29 resulted in it being aptly referred to as the "tuning fork" by the artisans manufacturing the machine. Electromagnetic table vibrators 30 of the type previously described in reference to the feed chute 19 are mounted under each inclined vibrating table 25.

Constructed in the surface contour of the vibrating tables 25 at the rear edge are casebearer larvae grooves 31. These grooves slope slightly outward and discharge into casebearer receptacles 32. In the operation of the machine the relatively round curled casebearer larvae roll to the rear into the larvae grooves 31 and the angular pecan meats move forward up the inclined vibrating tables 25. The last of this series of tables 25 discharge into a pecan meat discharge chute 33.

Referring to FIGS. 4, 5 and 6, the device utilizes a convention sixty (60) cycle alternating current (AC) power supply through a power panel 34. The power cable 35 is connected to an external source of electricity. The power to the system is fed through rheostats 36 which permit control of the amplitude of the vibration by varying the resistance. Switches are provided to each component of the system at the power panel 34. There is a timer switch 37 and table switches 38. The power supply to the electromagnet feed chute vibrator 21 and the table vibrators 30 must pass through selenium rectifiers 39 which in the ultimate result passes only the half wave of the AC current which causes the vibrators to pulsate at the frequency of the cycle. Some heat is generated in the rheostats 36 and the rectifiers 39 accordingly a cooling fan 40 is desirable in the power panel 34. In operating the device under conditions where casebearer larvae are to be separated from pecan meats containing quite small particles or pecan meat, periodic dusting or cleaning of the tables 25 is desirable. This periodic cyclic cleaning may be controlled by setting the timer 41 in the circuit to the feed chute 19. A warning light 42 is used in the timing circuit. The timer switch 37 is arranged, however, with a double pole switch which permits selective use of the timer 40 or it may be bypassed. The power panel 34 is provided with a main power switch 43 intermediate the external source of electricity and a distribution block 44 of the device.

In placing the device in operation, the materials to be processed are placed in the feed hopper 16. The main switch 43 is activated and the three switches 38 to each of the vibrating tables 25 are turned on. The rheostats 36 to the tables 25 are adjusted to give a moderate amplitude of vibration which is determined by touch. The timer switch 37 is activated which powers the feed chute vibrator 21. The rheostat 36 of this circuit is adjusted in such a manner as to supply an even flow of materials to be processed to the vibrating tables 25. The flow of materials is adjusted to an optimum rate by the rheostat 36 associated with the feed chute 19; and the rheostat 36 of the vibrating tables 25 are adjusted in such a manner as to arrive at an amplitude of vibration which will move the pecan meats up the incline tables 25 while at the same time permitting the casebearer larvae to roll to the lower edge of the tables 25 and into the casebearer larvae grooves 31.

This device has been described with particular emphasis on accomplishing the difficult task of separating casebearer larvae from pecan meats. What is desired to be claimed is a method and process, the machine and all equivalent uses, not departing from the inventive concept disclosed and within the equivalence of the appended claims.

I claim:

1. A process of separating casebearer larvae from pecan nut meats comprising the steps of:
   (a) placing pecan nut meats and casebearer larvae in a feed hopper,
   (b) vibrating the nut meats and larvae through a feed chute communicating with the said feed hopper,
   (c) sifting the nut meats and larvae over a perforated screen removing the pecan meat meal,
   (d) passing the nut meats and larvae over an inclined vibrating table,
   (e) collecting the larvae rolling off the lower end of the said inclined vibrating table, and
   (f) collecting the nut meats passing over the upper end of the said inclined vibrating table.

2. An apparatus for separating pecan casebearer larvae from pecan nut meats comprising:
   (a) a supporting frame,
   (b) a feed hopper mounted on said frame,
   (c) a vibrating feed chute communicating with said feed hopper,
   (d) a nut meat meal trap beneath said feed chute adapted to receive the work product of said feed chute,
   (e) a multiplicity of inclined vibrating tables mounted beneath said meal trap adapted to receive the work product of said nut meat meal trap,
   (f) resilient mounting means securing said vibrating tables to said support frame,
   (g) vibrator means secured to said inclined tables,
   (h) casebearer larvae collecting means communicating with the lower edge of said inclined vibrating tables, and
   (i) nut meat collecting means communicating with the upper edge of said inclined vibrating table.

3. The invention of claim 2 wherein the said vibrator means secured to the said inclined tables comprises:
   (a) an external source of electrical energy,
   (b) adjustable rheostats conductively attached to said source of electrical energy, and
   (c) electro-magnetic vibrators adapted to receive the electric energy output of said adjustable rheostat.

4. The invention of claim 2 wherein the said vibrating feed chute includes:
   (a) a narrow deep feed throat,
   (b) a flared declining discharge chute, and
   (c) an electro-magnetic vibrator operably attached to said vibrating feed chute, and
   (d) adjustable feed gate secured to said feed hopper and projecting into said narrow deep feed throat.

5. The invention of claim 2 wherein the said nut meat meal trap is mounted on the first of the series of vibrating inclined tables.

6. The invention of claim 2 wherein the resilient mounting means for said vibrating tables comprises:
   (a) a vibrating base,
   (b) resilient mounting cushions securing said vibrating base to the said frame, and
   (c) a counter balanced arm secured to and projecting from said vibrating base.

7. The invention of claim 2 wherein the vibrator means include:
   (a) an external source of alternating current,
   (b) adjustable rheostats conductably connected to said source of alternating current,
   (c) rectifiers conductably connected to said rheostats, and
   (d) electromagnetic vibrators conductably connected to said rectifiers.

8. The invention of claim 7 wherein a timer is imposed intermediate the said rectifier and at least one of the said electromagnetic vibrators.

References Cited

UNITED STATES PATENTS

| | | | |
|---|---|---|---|
| 2,350,332 | 6/1944 | Albaugh | 209—114 |
| 3,044,621 | 7/1962 | Pearlman | 209—112 |

M. HENSON WOOD, Jr., Primary Examiner

RICHARD A. SCHACHER, Assistant Examiner

U.S. Cl. X.R.

209—85, 112, 116